Patented July 4, 1944

2,352,850

UNITED STATES PATENT OFFICE 2,352,850

SAPOGENIN DERIVATIVES AND
PREPARATION OF SAME

Russell Earl Marker, State College, Pa., assignor
to Parke, Davis & Company, Detroit, Mich., a
corporation of Michigan No Drawing. Application March 8, 1941,
Serial No. 382,451

19 Claims. (Cl. 260—239.5)

Many plants contain complex glycosides, which are called saponins because of their property of forming stable foams in water. On hydrolysis with an acid, a saponin yields one or more sugars and a sugar-free moiety called the aglycone. The aglycones, also called sapogenins, are complex alcohols, most of which have been shown to contain either the polyhydropicene skeleton,

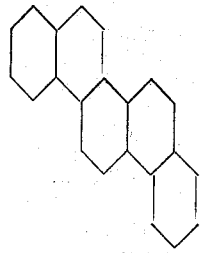

or the dimethylcyclopentanopolyhydrophenanthrene skeleton

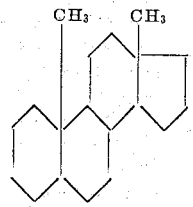

See further Fieser, "Chemistry of Natural Products Related to Phenanthrene," Reinhold Pub. of Corp., N. Y. C., (1936), p. 317 et seq., and "Richter's Organic Chemistry" (Nordemann Publishing Company, N. Y., 1939) vol. II, p. 512 et seq.

The sapogenins of the polyhydropicene group are also called triterpenoid sapogenins, and include substances such as hederagenin, ursolic acid, and glycyrrhizin.

The sapogenins of the dimethylcyclopentanopolyhydrophenanthrene group are also called steroidal sapogenins, and include substances such as sarsasapogenin, tigogenin, and diosgenin.

The steroidal sapogenins have, in general, the formula $C_{27}H_{42-4}O_{3-5}$, of which the portion $C_8H_{16}O_2$ is known to be present as a side chain attached to ring D of the steroid skeleton. Tschesche and Hagedorn, Ber. 68, 2247 (1935) proposed the formula

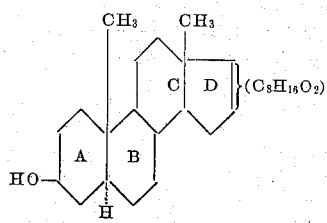

or

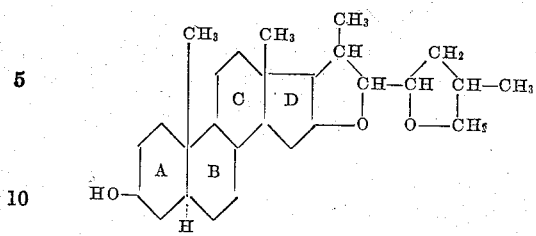

for the sapogenin, tigogenin, and later workers have, with reservations, accepted this formulation of the steroidal sapogenin side chain. Other sapogenins such as digitogenin, gitogenin, chlorogenin, diosgenin, and sarsasapogenin have been shown to differ from tigogenin only in regard to the connections between ring A and B, the degree of saturation of the ring system, and the number of substituents attached to these rings.

Recently, Marker and Rohrmann, J. Am. Chem. Soc. 61, 846 (1939), have shown that the side chain of the steroidal sapogenins more likely has the structure shown below:

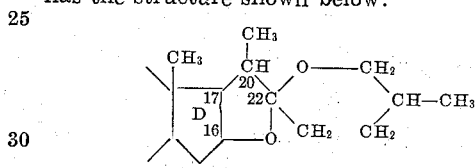

In my copending application, Serial No. 393,667, filed May 15, 1941, I have set forth the preparation of new sapogenin derivatives which I designate as pseudo-sapogenins. The unique properties of these pseudo-sapogenins make them particularly valuable as intermediates for the preparation of sex hormones.

The pseudo-sapogenins are readily formed, for example, by heating steroidal sapogenins with acid anhydrides, such as acetic anhydride, for about six to fifteen hours at approximately 200° C. The pseudo-sapogenins are very readily transformed by oxidative procedures into $\Delta^{16}$-20-keto-pregnene derivatives, and these, in turn are readily converted into hormones such as progesterone, testosterone, and desoxycorticosterone.

Now I have discovered a particularly valuable new group of sapogenin derivatives which, because of their peculiar structural features in rings A and B, are especially readily convertible into the above hormones without the necessity of extensive transformations in rings A and B.

My new sapogenin derivatives may be represented by the following structural formulae:

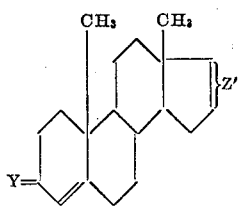

and

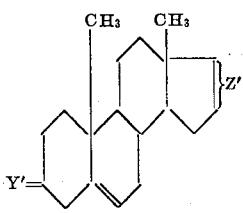

where Y is a member of the class consisting of (=O) and groups hydrolyzable to (=O), Y' is a member of the class consisting of

and groups hydrolyzable to

and Z' is the pseudo-sapogenin side chain.

Some of the new sapogenin derivatives of this invention contain the side chain characteristic of the pseudo-sapogenins. While the exact structure of this side chain is not certainly known, it is considered probable that the pseudo-sapogenin side chain may be one of the following:

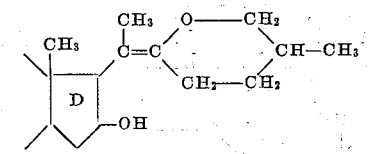

I

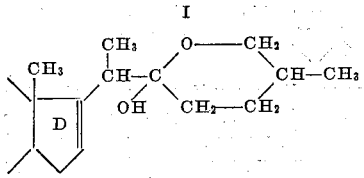

II

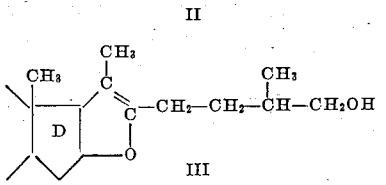

III

The pseudo-sapogenins have in the side chain a reactive hydroxyl group. In this specification this hydroxyl group will be referred to as the exo-hydroxyl group and correspondingly, derivatives of this hydroxyl group such as the acetate, the benzoate and the like may be designated as exo-acetate, exo-benzoate and the like. Similarly, the term exo-acylate refers to an acylated hydoxyl group in the side chain.

To summarize, the pseudo-sapogenin compounds may be characterized as a new class of substances derivable from the steroidal sapogenins and differing therefrom in the side chain attached to ring D. The following reactions are characteristic of the side chain of the pseudo-sapogenin compounds and serve to differentiate these compounds from previously known classes of substances.

The pseudo-sapogenin compounds are obtained, in the form of their exo-acetates, by the action of acetic anhydride at 200° C. for 6–15 hours on the steroidal sapogenins.

The pseudo-sapogenin compounds are converted into the steroidal sapogenins on refluxing with alcoholic hydrochloric acid.

The pseudo-sapogenin compounds are oxidized to $\Delta^{16}$-20-keto-pregnene compounds on treatment with chromic anhydride in acetic acid at 30° C., and subsequent alkaline hydrolysis.

The pseudo-sapogenin compounds include both acylated and unacylated compounds in which the side chain at ring D contains either a free hydroxyl group (exo-hydroxyl group) or an ester thereof (exo-acylate).

Where in the appended claims the word "pseudo" is used as a prefix for a sapogenin compound, it is to be understood that this term means that the sapogenin compound has a side chain at ring D containing an exo-hydroxyl group or an ester thereof and that this side chain is capable of undergoing the characteristic reactions as summarized above.

Where in the claims the term "pseudo-sapogenin side chain" is used, it is to be construed as being generic to side chains having either the free exo-hydroxyl group or the exo-acylate thereof.

My invention may be illustrated by the following examples:

*Example 1*

A mixture of 2 g. of diosgenin, 30 cc. of benzoyl chloride and 15 g. of freshly fused sodium acetate is heated in an oil bath at 220° C. for ten hours. Then the mixture is distilled in vacuo until no more distillate can be collected at 200° C. and 10 mm. pressure. The residue in the distilling flask is cooled and alcoholic sodium hydroxide solution is added. After warming for one-half hour, the mixture is diluted with water and ether, and the layers separated. The ethereal layer is washed with water and dilute sodium hydroxide and then evaporated to dryness on a steam bath. This residue is pseudo-diosgenin. It may be purified by crystallization from slightly diluted alcohol and is thus obtained as white crystals which readily decolorize bromine in acetic acid. Pseudo-diosgenin exists in polymorphic forms, M. P. 190–192° C. and 172–174° C.

*Example 2*

(a) A mixture of 5 g. of diosgenin and 25 cc. of acetic anhydride is heated in a bomb tube at 195–200° C. for six to fifteen hours. Then the acetic anhydride is evaporated in vacuo to leave a residue which crystallizes after cooling. This residue may be recrystallized from methanol and then has a melting point of 97–101° C. It is pseudo-diosgenin diacetate.

Instead of using acetic anhydride in this step the diosgenin may be heated to 200° C. for six to fifteen hours with propionic anhydride, butyric anhydride, valeric anhydride or any other carboxylic acid anhydride. However, the yields are best with the lower aliphatic mono-carboxylic acid anhydrides.

(b) Three grams of pseudo-diosgenin diacetate is refluxed with 150 cc. of 2% alcoholic sodium hydroxide for thirty minutes. Then water and ether are added, and the layers separated. The ethereal layer is washed with water, and then evaporated. The residue is crystallized from methanol and ether to give pseudo-diosgenin of M. P. 192° C.

The following diagram shows the reactions involved in the example:

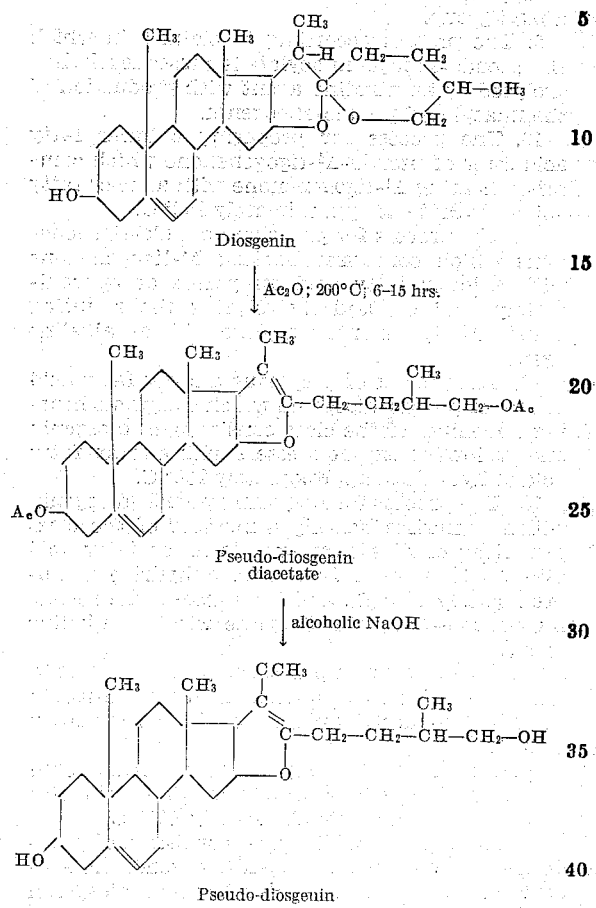

Diosgenin

Ac₂O; 200° C; 6-15 hrs.

Pseudo-diosgenin diacetate alcoholic NaOH

Pseudo-diosgenin where Ac represents the acetyl radical, $$CH_3-\overset{O}{\underset{\|}{C}}-$$

Example 3

(a) To a cold solution of 2 g. of diosgenin in 50 cc. of glacial acetic acid is added slowly 4.8 cc. of an M bromine solution in acetic acid. After the mixture has stood for fifteen minutes a solution of 1 g. of chromic anhydride in 10 cc. of 90% acetic acid is added while maintaining the temperature of the mixture at 25° C. After this mixture has stood for thirty minutes water is added and the precipitated material is extracted with ether. The ethereal solution is washed well with water and then 100 cc. of acetic acid and 2 g. of zinc is added. The mixture is heated on a steam bath so as to distill off the ether. After all the ether has been removed an additional 2 g. of zinc is added and the mixture is heated an additional hour on the steam bath. Then the clear liquor is decanted and filtered from the caked zinc and the filtrate concentrated in vacuo. The residue is dissolved in ether and the ethereal solution washed well with sodium carbonate solution. Then the ethereal extract is concentrated to a small volume. The product which crystallizes is collected and crystallized from pentane. In this manner there is obtained $\Delta^4$-tigogenenone of M. P. 186–188° C.

$\Delta^4$-tigogenenone shows the characteristic reactions of a sapogenin and of a $\Delta^4$-unsaturated steroid. For example, it forms a semi-carbazone, a red 2,4-dinitrophenylhydrazone, a pseudo-sapogenin, and so forth. It may be represented by the following structural formula

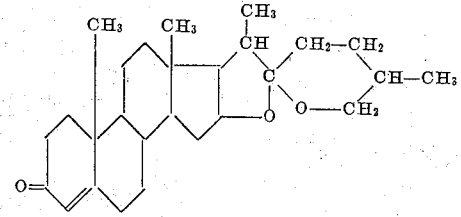

If the debromination, in the above example, is conducted using zinc and alcohol instead of zinc and acetic acid, there is obtained $\Delta^5$-tigogenenone, in which the double bond is at $C_5-C_6$.

Example 4

(a) A mixture of 10 g. diosgenin, 500 cc. of dry toluene, 75 cc. of cyclohexanone and 25 g. of aluminum isopropylate is refluxed for ten hours. Then water and ether are added and the ethereal layer separated. After washing the ethereal extract well with dilute hydrochloric acid and with dilute sodium hydroxide, the ether is evaporated and the residue steam-distilled for two hours to remove the excess cyclohexanone. The residual liquor containing suspended organic material is extracted with ether, the ethereal layer separated and the ether removed. This residue is crystallized from pentane and from ether-pentane to yield $\Delta^4$-tigogenenone of M. P. 186–188° C. It is identical with the product of Example 3.

(b) A mixture of 6 g. of $\Delta^4$-tigogenenone and 25 cc. of acetic anhydride is heated in a sealed tube at 200° C. for ten hours. Then the excess acetic anhydride is removed on a steam bath to leave a residue which is pseudo-$\Delta^4$-tigogenenone acetate. This substance is very difficult to crystallize and is usually obtained in the form of a syrup.

(c) The pseudo-$\Delta^4$-tigogenenone acetate prepared as described above is heated on a steam bath for thirty minutes with 500 cc. of 1% methanolic potassium hydroxide solution. Then water is added and the mixture is extracted with ether. The ethereal solution is treated with Norite and then evaporated to leave a yellow oil. This is pseudo-$\Delta^4$-tigogenenone. Attempts to crystallize this from the usual solvents have so far been unsuccessful.

The above steps may be illustrated by the following diagram:

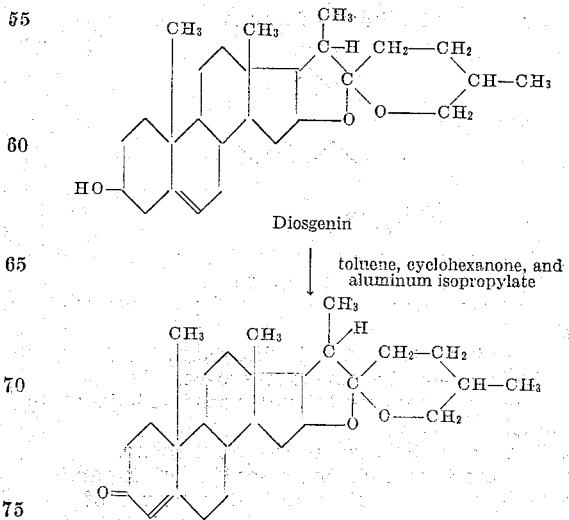

Diosgenin toluene, cyclohexanone, and aluminum isopropylate

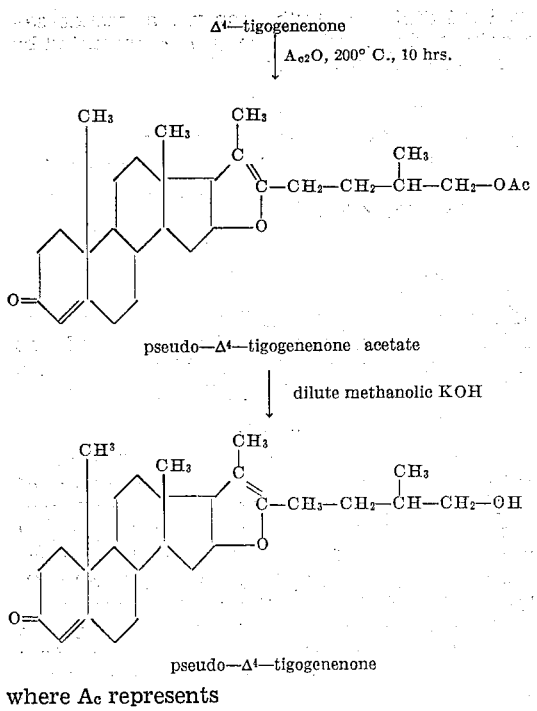

where Ac represents

Pseudo-Δ⁴-tigogenenone shows the reactions characteristic of a pseudo-sapogenin. For example, when 300 mg. of pseudo-Δ⁴-tigogenenone is refluxed for thirty minutes with 10 cc. of methanol and 1 cc. of concentrated hydrochloric acid there may be obtained, after working the mixture up in customary fashion, Δ⁴-tigogenenone of M. P. 186–188° C.

This application is a continuation-in-part of Serial No. 317,419, filed February 5, 1940.

What I claim as my invention is:

1. A compound of the class consisting of compounds having the formula,

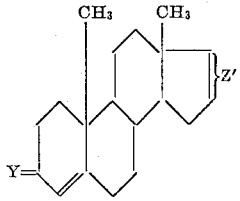

and compounds having the formula,

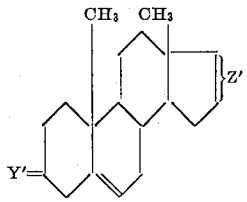

and Z' is the pseudo-sapogenin side chain.

2. A pseudo-diosgenin diacylate.
3. A lower fatty acid diester of pseudo-diosgenin.
4. The diacetate of pseudo-diosgenin.
5. A pseudo-Δ⁴-tigogenenone-exo-acylate.
6. A lower fatty acid ester of pseudo-Δ⁴-tigogenenone.
7. The acetate of pseudo-Δ⁴-tigogenenone.
8. The process which comprises isomerizing and acylating the side chain attached to ring D of a steroidal sapogenin of the group consisting of Δ⁴-tigogenenone, diosgenin and diosgenin acylates by reacting said sapogenin with a carboxylic anhydride at 175–250° C., with production of a pseudo-sapogenin acylated at least at the exo-hydroxyl group.

9. The process according to claim 8 in which the pseudo-sapogenin acylate is subsequently hydrolyzed by an alkaline agent with production of the unacylated pseudo-sapogenin.

10. The process for preparing a lower fatty acid ester of pseudo-Δ⁴-tigogenenone which comprises heating Δ⁴-tigogenenone with a lower fatty acid anhydride at approximately 200° C.

11. The process for preparing pseudo-tigogenenone which comprises heating Δ⁴-tigogenenone with a lower fatty acid anhydride at approximately 200° C., and hydrolyzing the resulting pseudo-Δ⁴-tigogenenone acylate with an alkaline agent.

12. The process of preparing a lower fatty acid diester of pseudo-diosgenin which comprises heating a member of the class consisting of diosgenin and its lower fatty acid esters with a lower fatty acid anhydride at approximately 200° C.

13. The process for preparing pseudo-diosgenin which comprises heating a member of the class consisting of diosgenin and its lower fatty acid esters with a lower fatty acid anhydride at approximately 200° C., and hydrolyzing the resulting pseudo-diosgenin diacylate with an alkaline agent.

14. The process for preparing pseudo-diosgenin diacetate which comprises heating diosgenin acetate with acetic anhydride at approximately 200° C.

15. The process for preparing pseudo-diosgenin diacetate which comprises heating diosgenin with acetic anhydride at approximately 200° C.

16. A compound of the class consisting of pseudo-Δ⁴-tigogenenone, pseudo-Δ⁴-tigogenenone exo-acylates, pseudo-diosgenin and pseudo-diosgenin diacylates.

17. A compound of the class consisting of compounds having the formula,

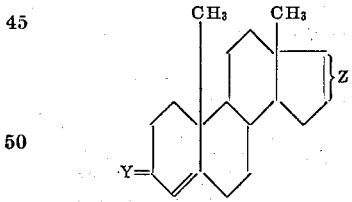

and compounds having the formula,

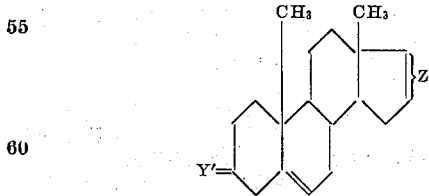

where Y is a member of the class consisting of (=O) and groups hydrolyzable to (=O), Y' is a member of the class consisting of

and groups hydrolyzable to

and Z is the pseudo-sapogenin side chain containing a free exo-hydroxyl group.

18. A compound of the class consisting of compounds having the formula,
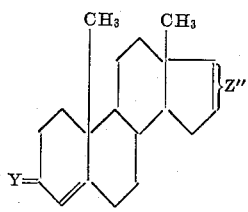
and compounds having the formula,
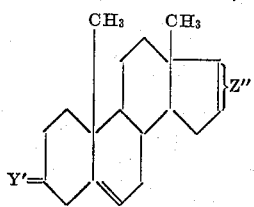
where Y is a member of the class consisting of (=O) and groups hydrolyzable to (=O), Y' is a member of the class consisting of
and groups hydrolyzable to
and Z'' is the pseudo-sapogenin side chain containing an exo-acylate group.
19. Pseudo-diosgenin.
RUSSELL EARL MARKER.

Certificate of Correction

Patent No. 2,352,850.                                    July 4, 1944.

RUSSELL EARL MARKER

It is hereby certified that errors appear in the printed specification of the above numbered patent requiring correction as follows:

Page 3, first column, lines 31 to 35, for that portion of the formula reading

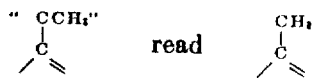

page 4, first column, line 63, claim 1, after the formula and before "and Z'", line 64, same claim, insert the following: *where Y is a member of the class consisting of ($=O$) and groups hydrolyzable to ($=O$), Y' is a member of the class consisting of*

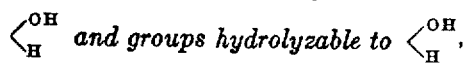

and that the said Letters Patent should be read with these corrections therein that the same may conform to the record of the case in the Patent Office.

Signed and sealed this 12th day of April, A. D. 1949.

[SEAL]

THOMAS F. MURPHY,
                                                       *Assistant Commissioner of Patents.*